(12) United States Patent
Smith

(10) Patent No.: US 11,186,231 B1
(45) Date of Patent: Nov. 30, 2021

(54) TELESCOPING STORAGE CONTAINER

(71) Applicant: Robert M. Smith, Pasadena, TX (US)

(72) Inventor: Robert M. Smith, Pasadena, TX (US)

( * ) Notice: Subject to any disclaimer, the term of this patent is extended or adjusted under 35 U.S.C. 154(b) by 0 days.

(21) Appl. No.: 16/054,458

(22) Filed: Aug. 3, 2018

Related U.S. Application Data

(60) Provisional application No. 62/541,229, filed on Aug. 4, 2017.

(51) Int. Cl.
*B60R 9/06* (2006.01)
*B60R 11/06* (2006.01)

(52) U.S. Cl.
CPC .............. *B60R 9/065* (2013.01); *B60R 11/06* (2013.01)

(58) Field of Classification Search
CPC ................................ B60R 9/065; B60R 11/06
USPC .................................................. 224/403–404
See application file for complete search history.

(56) References Cited

U.S. PATENT DOCUMENTS

| | | | | |
|---|---|---|---|---|
| 956,189 A * | 4/1910 | Schwarz | ................. | B66F 7/065 187/269 |
| 2,501,001 A * | 3/1950 | Neely | .................... | B66F 7/065 254/122 |
| 5,088,636 A * | 2/1992 | Barajas | .................... | B60R 11/06 224/281 |
| 8,931,819 B2 * | 1/2015 | Daniel | ................... | B60J 7/1621 29/428 |
| 9,004,299 B2 * | 4/2015 | Hardin | ................... | A47B 61/04 211/144 |
| 9,156,412 B1 * | 10/2015 | Calvert | ...................... | B60P 7/08 |
| 2011/0094983 A1 * | 4/2011 | Burnside-Hall | ..... | B43M 99/001 211/69.1 |
| 2012/0080901 A1 * | 4/2012 | Izydorek | ................. | B60R 9/042 296/37.6 |
| 2016/0368542 A1 * | 12/2016 | Taylor | ....................... | B66F 7/28 |

* cited by examiner

*Primary Examiner* — Scott T McNurlen

(57) ABSTRACT

A telescoping storage container adapted for receipt in a bed of a pickup truck and behind a cab of the truck. The storage container includes an open top external box and an open top internal box. The internal box is sideably received inside the external box and includes one of more sliding tool storage drawers and a shelf with a rotating bin for easy access to the stored tools. The internal box includes a moveable top lid, which covers an open top in the external box and an open top in the internal box. The storage container, when configured as a truck toolbox, is dimensioned for receipt on the truck bed and next to the rear of a truck cab. Also, the storage container includes a self-contained battery power supply system to operate a scissor lift for raising and lowering the internal box inside the external box.

20 Claims, 4 Drawing Sheets

TELESCOPING STORAGE CONTAINER

This nonprovisional patent application claims the benefit of the subject matter and the filing date of a provisional patent application, Ser. No. 62/541,229, filed on Aug. 4, 2017, by the subject inventor and having a title of "Telescoping Storage Container".

BACKGROUND OF THE INVENTION

(a) Field of the Invention

This invention relates to a telescoping storage container for holding various tools and the like and more particularly, but not by way of limitation, to truck tool boxes and jobsite toolboxes having an open top external box and an open top internal box, with tool storage drawers and shelves received inside the internal box.

The internal box includes a moveable top lid for covering the open top of the external box and the open top internal box, when in a lowered position. The external and internal boxes are received on top of a truck bed and next to a rear of a truck cab, or the telescoping container can be reconfigured into a jobsite toolbox and used at a construction site to hold tools and other construction materials.

(b) Discussion of Prior Art

Current storage boxes, designed to fit in the bed of a truck or in a jobsite toolbox configuration, cause tools, rigging material, supplies, and other stored items to be piled one on top of one another in a disorganized manner. Also, these types of boxes provide access to the tools only from the front or open top of the box, with no side entrance into the box. Further, because today's pickup trucks and similar vehicles sit higher off the ground and have higher side panels, it is difficult to gain access inside a truck toolbox configuration.

In U.S. Pat. No. 6,626,479 to Skong, a truck storage container is disclosed having three treaded rods with electric motor for raising and lower the entire container next to the rear of a truck cab. In U.S. Pat. No. 6,467,830 to Cortright, a self-contained toolbox is illustrated with an external box and an internal box. The internal box can be raised upwardly from inside the external box for easy access to the tools stored inside the internal box. However, this invention encompasses the entire bed of the truck, and it not configured as a conventional truck toolbox.

While the above mentioned patents describe similar individual toolbox features, when compared to the subject invention, these references don't incorporate all of the unique features in combination to provide the objects and advantages of the subject telescoping storage container, adapted for receipt on the bed of a truck vehicle or as a free standing storage container, such as a jobsite toolbox used on a construction job site, as described herein.

SUMMARY OF THE INVENTION

In view of the foregoing, it is a primary objective of the subject invention to provide a telescoping storage container for easy access to tools and the like from both the sides of the container.

Another object of the invention is an open top internal box, received inside an open external box, includes a movable, weather proof, top lid for covering the two boxes, when the internal box is retracted inside the external box. Also the top lid continues to provide weather protection even when in the internal box is in an extended position.

Still another object of the invention is the internal box includes side mounted, sliding drawers, which can tilt downwardly for ease in viewing tools inside the drawers. Also, the internal box can include a fixed or sliding shelf with a rotating bin for quickly viewing items on the bin.

The telescoping bed storage container includes an open top external box and an open top internal box. The internal box is sideably received inside the external box and includes one of more sliding tool storage drawers and a shelf with a rotating bin for easy access to the stored tools. The internal box includes a moveable top lid, which covers an open top in the external box and an open top in the internal box. The storage container, when configured as a truck toolbox, is dimensioned for receipt on a truck bed and next to a rear of a truck cab. Also, the storage container includes a self-contained battery power supply system to operate a scissor lift for raising and lowering the internal box.

These and other objects of the present invention will become apparent to those familiar with different types of vehicle storage containers when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate the complete preferred embodiments in the present invention according to the best modes presently devised for the practical application of the subject storage container, and in which:

FIG. 3 B is an enlarged perspective view of the rotating bins and bin shelf.

DETAILED DESCRIPTION OF THE PREFERRED EMBODIMENTS

Figure 1:
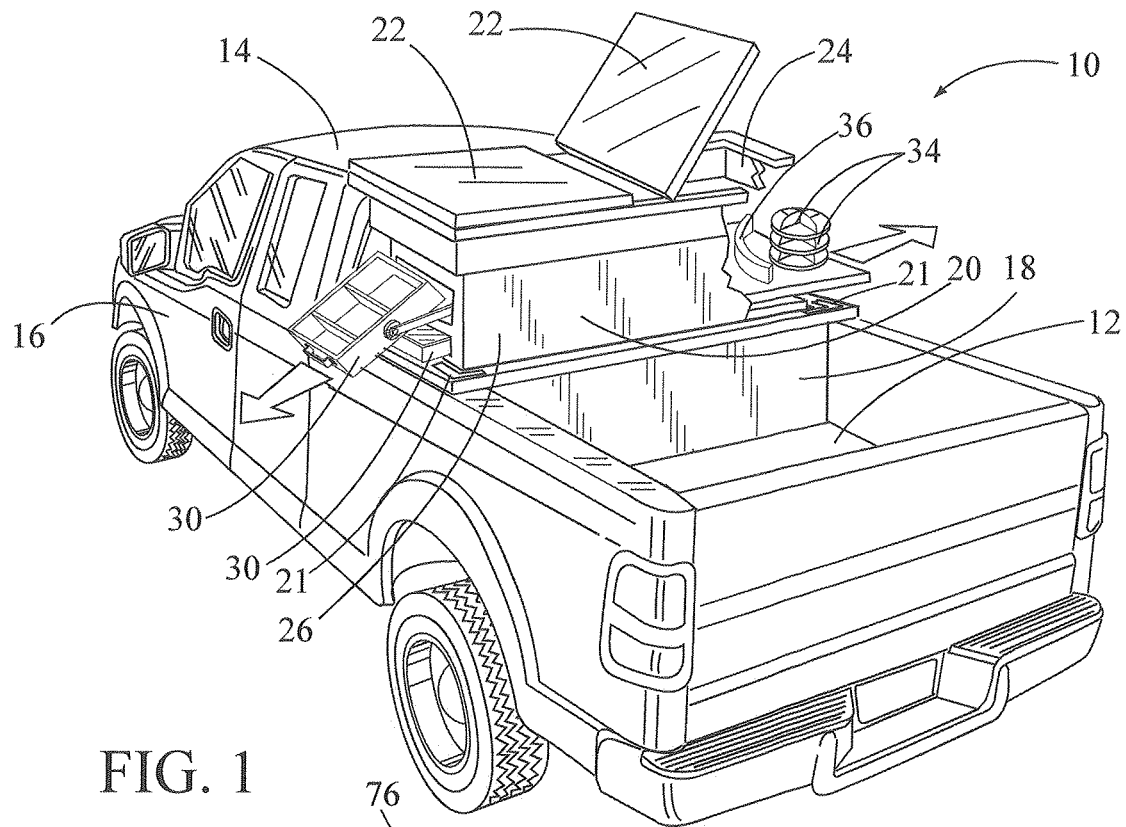
FIG. 1 is a perspective view of the subject telescoping truck bed storage container with an internal box raised upwardly from an external box for easy access into side drawers and a shelf with rotating bins.

In FIG. 1, the subject truck bed, telescoping storage container is shown having a general reference numeral 10.

The container 10 is shown mounted on top of a truck bed 12 and next to the rear of a vehicle cab 14. The cab 14 is part of a pickup truck 16.

The storage container 10 includes an open top, external box 18 dimensioned for receipt on the truck bed 12. An open top internal box 20 is slidably received inside the external box 18. Around the perimeter of the open top of the external box 18 are mounted pressure sensors 21. This feature allows for setting off an alarm if the internal box is not properly lowered and seated on top of the exterior box The internal box 20 includes a pair of hinged wing top lids 22 used for a weather proof cover over the open tops in the two boxes. While the two wing top lids 22 are shown in the drawings, it should be noted that a single top lid covering the open top would work equally well. The two wing top lids 22, when raised as shown in this drawing, provide quick access to tools stored in a top portion 24 of the internal box 20 and on opposite sides of the internal box. This feature allows for access to the tools without having to raise the internal box 20 above the external box 18.

Figures 3, 3A, 3B:
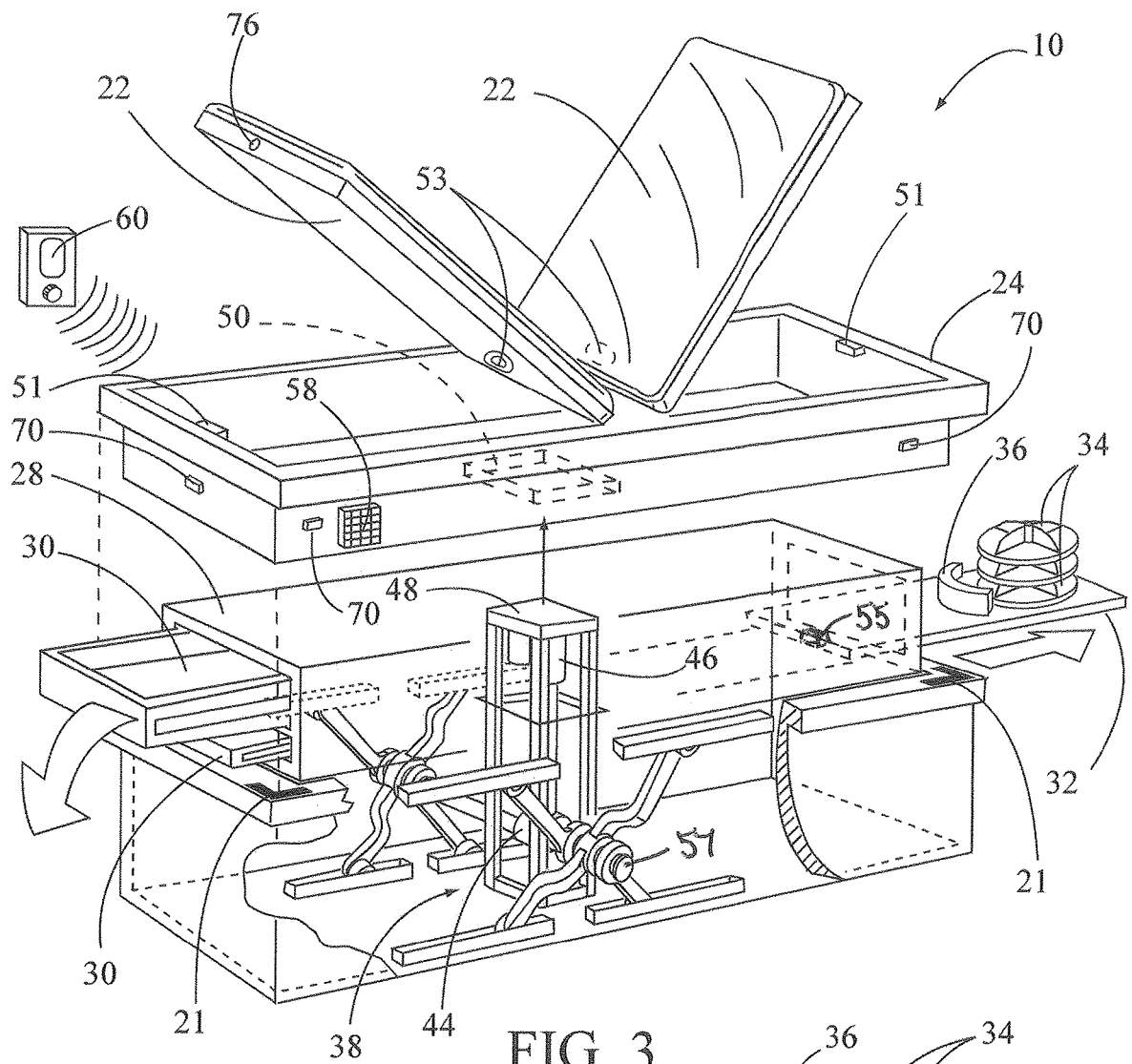
FIG. 3 is still another perspective view of the storage container and illustrating a linear actuator attached to an actuator tower mounted inside the exterior and interior boxes. The actuator is used for raising and lower the scissor lift.
FIG. 3A is an enlarged perspective view of the top of the actuator tower, with a battery box and control module box attached to the linear actuator.

The internal box 20 includes the top portion 24 and a bottom portion 26. The top and bottom portions are divided by a sheet panel 28. The panel 28 is shown in FIG. 3. Tools in the top portion 24 are stored on top of the panel 28. Slideably mounted on one side of the pickup and in a side of the bottom portion 26 are a pair of tiltable pull out drawers 30. The tiltable feature of the drawers 30 provide for easy viewing and removing of tools stored therein. On the opposite side of the bottom portion 26 of the internal box 20 is a pull out shelf 32 with rotateable bins 34 mounted thereon. By rotating the bins 34, a tool or fasteners can be quickly selected. A semi-circular shield 36 is disposed behind the bins 34 to prevent items from being dropped or lost behind the bins.

Obviously, the internal box 20 can include a variety of different sizes and shapes of drawers or shelves, in the opposite sides of the internal box.

Figure 2:
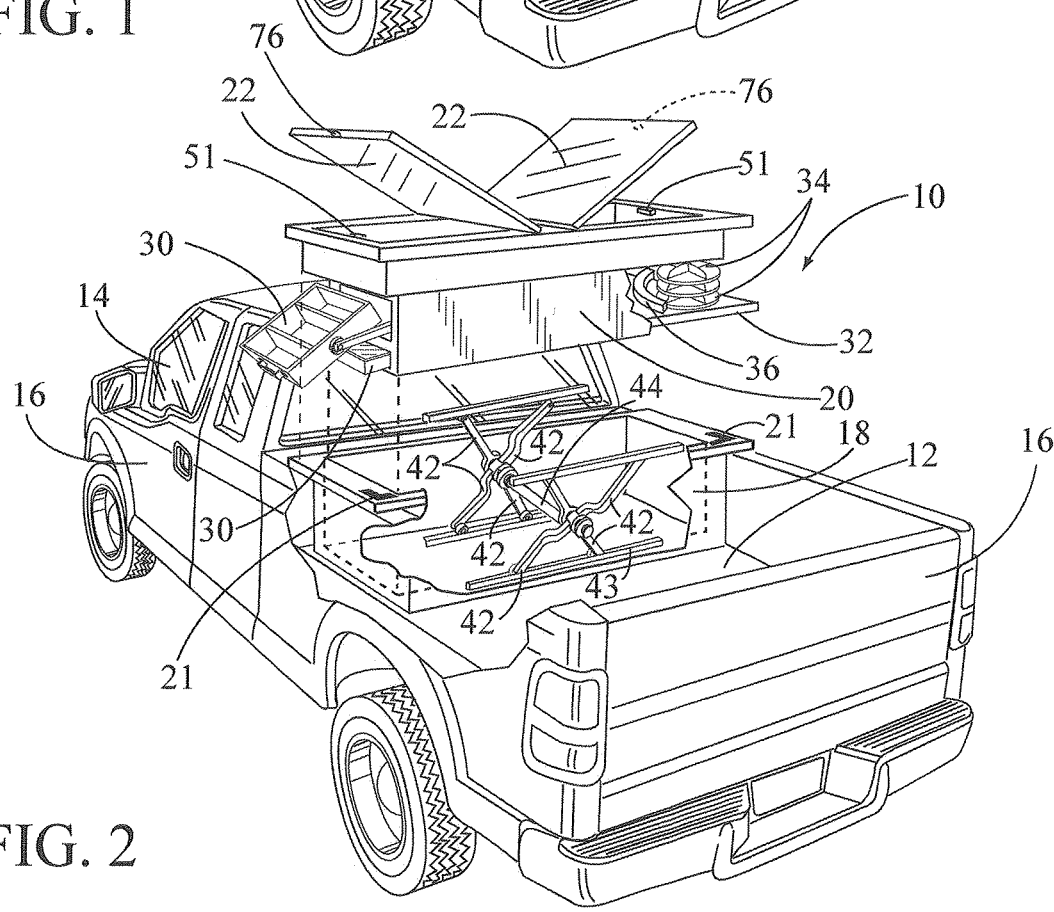
FIG. 2 is an exploded view of the storage container with the internal box in a raised position above an external box and illustrating a battery powered, low profile, center pivot, scissor lift.

In FIG. 2, the internal box 20 is shown in a raised, exploded view above the external box 18. In this drawing, a low profile, center pivot, scissor lift assembly is shown having a general reference numeral 38. The lift assembly 38 includes scissor arms 40, roller bearings 42 amounted on the one end of the scissor arms, and slide rails 43, shown in greater detail in FIGS. 4 and 4A. An opposite end of the arms 40 are also attached to roller bearings 42 riding in slide rails 43. The center pivot shaft 44 is attached to a lower end of a linear actuator 46, shown in FIGS. 3, 3A, and 4A. The linear actuator 46 includes a built in motor. The linear actuator 46 is battery powered and used to raise and lower the lift assembly 38 and the interior box 20.

Figure 4:
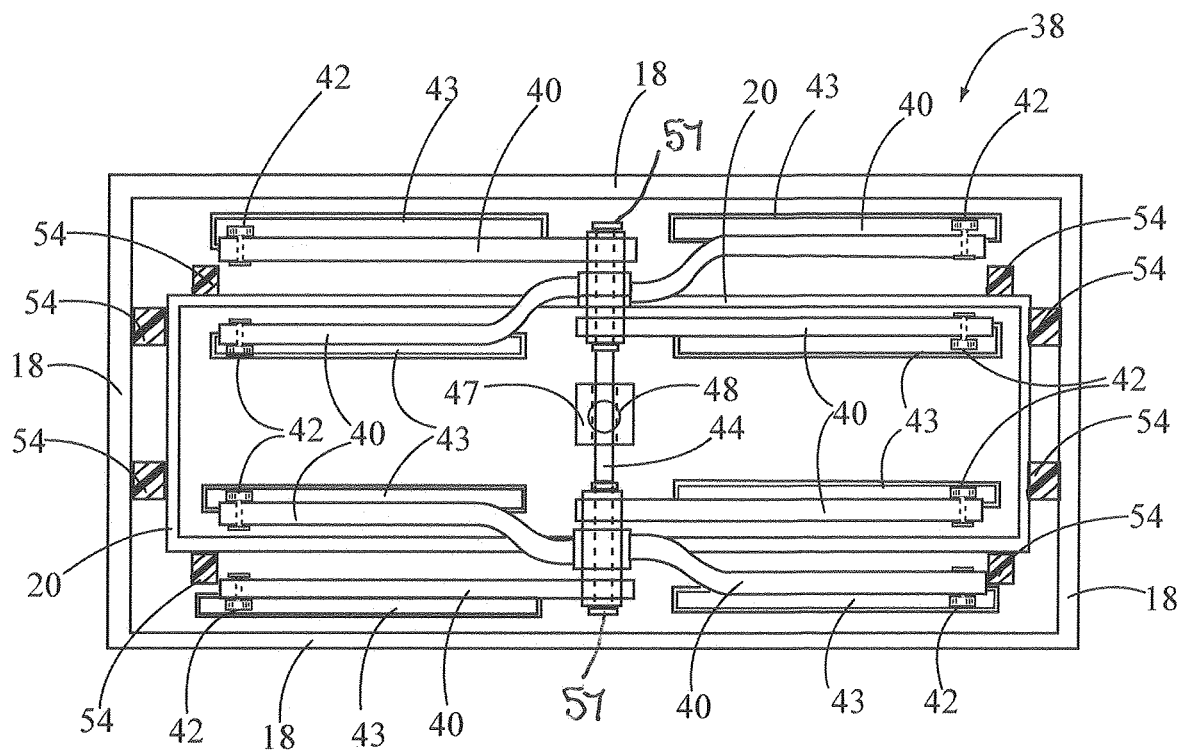
FIG. 4 is a top view of the scissor lift mounted inside the exterior and interior boxes and having a center pivot shaft, which is attached to the linear actuator.
Figure 4A:
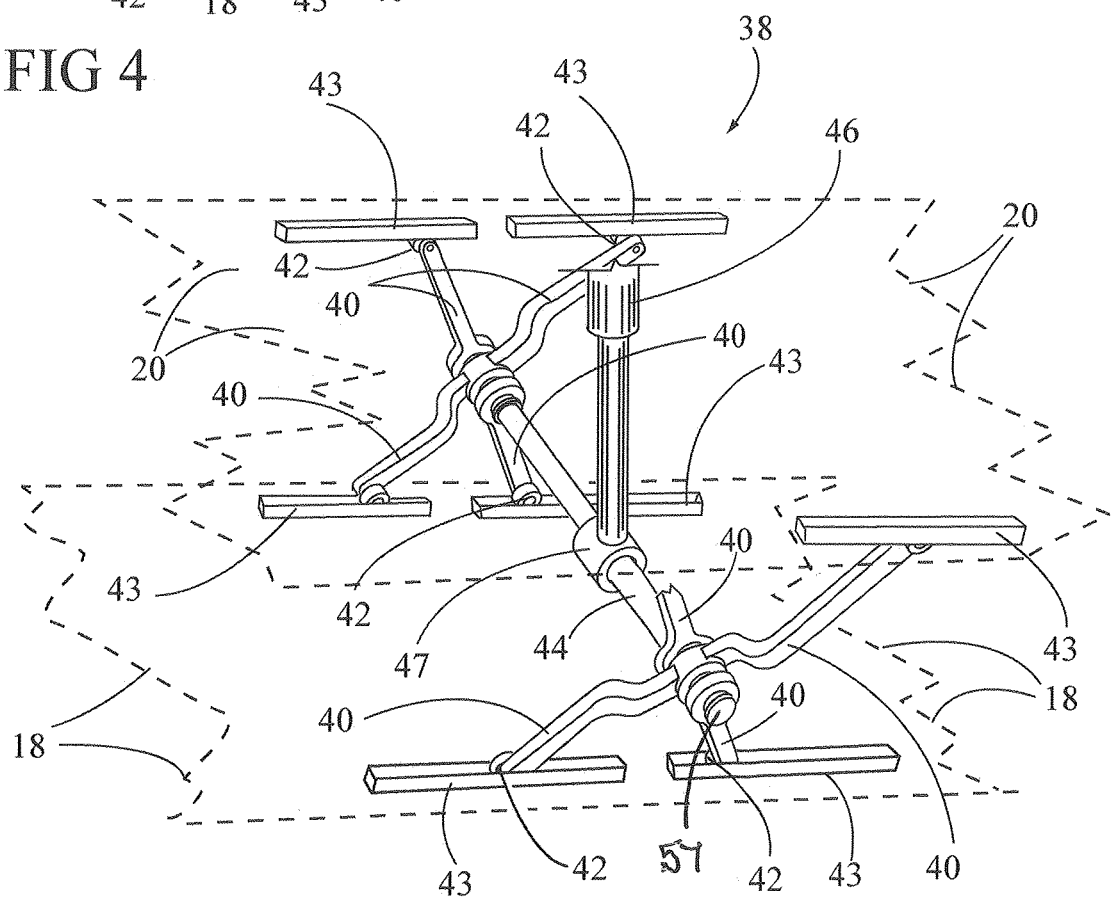
FIG. 4A is a perspective view of the scissor lift shown in FIG. 4 and illustrating the scissor arms riding in slide rails mounted on the external and internal boxes.

The center pivot shaft 44 includes an internal hub 57, connected to the center of the scissor arms. The internal hub 57 is shown in FIGS. 3, 4 and 4A. The hub 57 spins on the shaft 44 when the scissor arms are raised and lower using the linear actuator 46. This feature allows the scissor assembly 38 to lay completely flat on top of the bottom of the external box 18, thereby reducing the space required when the internal box 20 is lowered into the exterior box.

In FIG. 3, a perspective view of the storage container 10 is shown and removed from the truck bed 12. In this drawing, the top of the linear actuator 46 is shown attached to an actuator tower 48, which extends upwardly through an opening 45 in the panel 28. Through the use of the linear actuator 46 attached to the center pivot shaft 44, room is provided in the bottom portion 26 of the internal box 20 for having the side mounted drawers 30 and the shelf 32.

The top portion 24 of the internal box 20 includes electric locks 51 for securing the two wing lids 22 in a lock position. The lids 22 also include a switch 53 for sounding an alarm if the lids are not properly closed. Further, the drawers 30 and shelf 32 include switches 55 for sounding an alarm if they are not properly closed, when the internal box is lowered into the external box. Still further, the top portion 24 of the interior box 20 includes a key pad 58, with an alarm 66, and a hand held transmitter 60 for remotely operating and controlling the operation of the storage container 10. Also, the storage container 10 can include a wireless key 68 and a manual key switch 70 for use in the container's operation, as discussed above.

Figure 5:
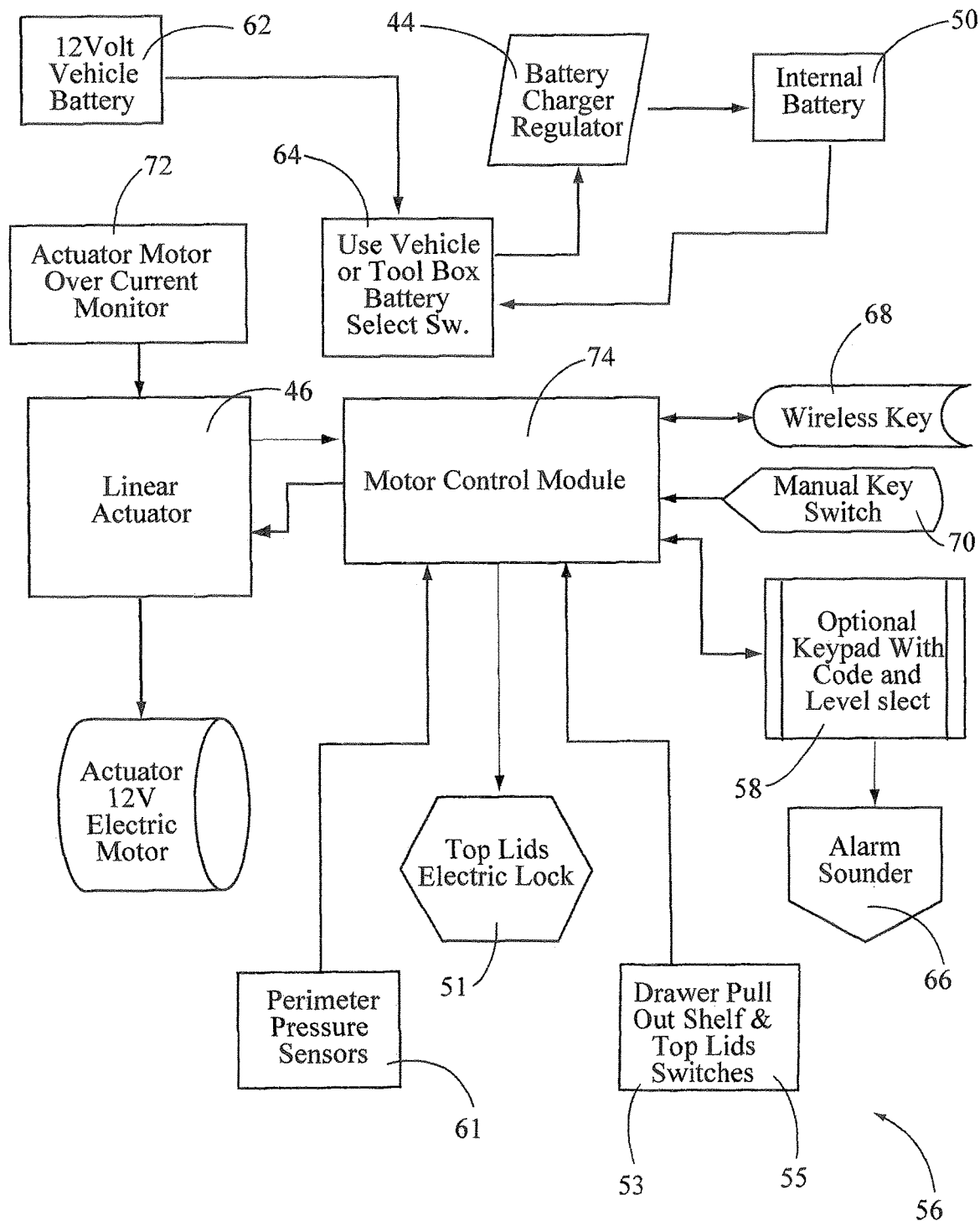
FIG. 5 is a block diagram of the battery operated electrical system for operating the scissor lift, switches, and sensors mounted on the container.

In FIG. 3A, an enlarged perspective view of the top of the actuator tower 48 is shown with the linear actuator 46 electrically connected to an internal battery box 50, with a built in charging regulator 49, and an internal control module box 52, with a built in master control 74. The master control 74 is shown in FIG. 5.

In FIG. 3 B, an enlarged perspective view of the rotating bins 34 with rear shield 36 are shown mounted on top of the pull out bin shelf 32.

In FIG. 4, a top view of the scissor lift assembly 38 is illustrated mounted inside the exterior and interior boxes 18 and 20. In this drawing, a lower portion of the linear actuator 46 is shown attached to a collar 47 mounted on the center pivot shaft 44. In this drawing, two of the scissor arms 40 are elongated and have an offset configuration for transitioning from lower slide rails 43 on a bottom of the external box 18 upwardly to upper slide rails 43 mounted on a bottom of the internal box 20. Vertical bumpers 54 are provided on the outer sides of the internal box 20 to provide proper alignment between the two boxes and the internal box is raised and lowered inside the external box.

In FIG. 4A, a perspective view of the scissor lift assembly is shown and illustrating the scissor arms 40 with roller bearings 42 riding in the slide rails 43 mounted inside the bottom of the external box 18 and on the bottom of the internal box 20. In this drawing, the lower portion of the linear actuator 46 is shown attached to the shaft collar 47 centered on the center pivot shaft 44.

In FIG. 5, a block diagram of a battery operated electrical system, having general reference numeral 56 mounted on the storage container 10. While the electrical system 56 is shown in this drawing, it should be kept in mind the storage container 10 can be electrical wired in a variety of ways without departing from the spirit and scope of the subject invention.

In this drawing, the electrical system 10 can be powered using a 12 volt vehicle battery 62 connected to a vehicle or tool box battery select switch 60. The select switch allows for using either the vehicle battery 62 or the internal battery box 50. The battery charging regulator 49 is built into the internal battery box 50.

In operation, the electrical current passes from the battery select switch 64 to an actuator motor over current monitor 72, which is connected to the linear actuator 46 with built in actuator motor. The current monitor 72 senses any sudden changes in motor current while the internal box 20 is in motion. If the current suddenly increases, this may indicate something is in the operational path or a collision may have occurred during movement of the box 20. If this occurs, a signal is sent to the actuator 46 that an over current has occurred and the actuator electric motor will stop. The power then exits the current monitor 72 and is fed to a master control 74, which is built into the control module box 52, shown in FIG. 3A.

The master control 74 provides output power and switching in proper amounts to affect the speed of interior box 20 movement with varying weight loads. Also, the master control 74 provides for motor braking for fast stops and reversing if a collision or a safety issue is detected.

Further, the master control 74 provides electrical forward and reverses polarity function to the actuator motor. This allows the motor to change its direction to operate the linear actuator 46 in a retracting or extending function for raising and lowering the interior box 20.

The master control 74 also has inputs from the switches mounted inside the exterior box 18 to communicate when a limit of a direction has been reached and a potentiometer mounted on the lifting tower 48 to indicate high position and operating speed of the actuator 46. Also, the master control 74 receives all safety and collision information from a multiple of inputs of switches and sensors, discussed above, that are mounted on the external and internal boxes 18 and 20.

The master control 74 also functions to receive operator input functions from an electric key switch that is turned in different directions to drive the interior box 20 box up and down, or a wireless key transmitter, like one found for control of a car door lock, or the keypad 58 to provide access by inputting a code. The keypad will provide a convenience of automatically driving the interior box to a selected height and closing the box on command. The key pad has the same functions as a wireless hand held key transmitter. The wireless key and the key pad control the storage container 10 access by controlling the up and down movement of the inner tool box, electrically locking and unlocking the tool box top lids and setting the sentry alarm mounted on the toolbox.

While the invention has been particularly shown, as a truck tool box described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

What is claimed is:

1. A telescoping storage container adapted for receipt in a bed of a truck or used as a standalone job site box, the storage container comprising:
   an open top five sided external box;
   an open top two portioned five sided internal box, that is slideably received inside the external box, a lower portion of the internal box comprising an open area on at least one side of the internal box to mount a fixed or pull out shelf;
   a horizontal dimension of a top portion of the internal box is larger than a horizontal dimension of the external box;
   one or more lids attached to a top portion of the internal box for covering the open top of the internal and external boxes, the lid provides contiguous closure and a means for weather protection to the external and internal boxes when the internal box is in a most lowered position;
   an electric operated lift means with one end attached to a top of a lifting tower that is mounted centered and at a bottom of an interior floor of the external box, an opposite end of the lift means is connected to a center pivot shaft;
   two or more scissor arms connected at their midpoint to the center pivot shaft; opposing two ends of each scissor arm connects the internal and external boxes together by way of bearings and slide rails on the bottom of each box;
   the lift means is for vertically lifting and lowering the internal box from inside the external box; and
   at least one pull out sliding storage compartment in at least one side of the lower portion of the internal box.

2. The storage container as described in claim 1 further including a storage shelf in an opposite side of the lower portion of the internal box.

3. The storage container as described in claim 1 further including a rotating circular bin storage compartment and a rear close fitting circular wrap-around shield mounted just open in the front to allow for positioning the desired items close to the person for ease of access.

4. The storage container as described in claim 1 further comprising a storage compartment mounted in one side of the lower portion of the internal box, the storage compartment has a rotating tilt lock mechanism built into a side of the compartment to utilize when the internal box is raised and the storage compartment needs to tilt downward.

5. The storage container as described in claim 1 wherein the electrically operated lift means utilizes the scissor arms center-connected to the center pivot shaft, the shaft attached to the electrically powered lift means that is operated vertically from the top of the lifting tower for raising and lowering the internal box by the center pivot shaft.

6. The storage container as described in claim 1 wherein the internal box lower portion and top portion are divided by a dividing panel, the top portion is larger and adapted for holding longer items therein, items are accessible in the top portion by lifting the lid without raising the internal box.

7. The storage container as described in claim 1 wherein by raising the lid, items can be accessed in the top portion of the internal box and the lid continues to provide weather protection for the external box even when the internal box is in an extended position.

8. A telescoping storage container adapted for receipt in a bed of a pickup truck or used as a standalone job site box, the storage container comprising:
   an open top five sided external box;
   an open top two portioned five sided rectangle internal box, that is slideably received inside the external box;
   a lower portion of the internal box comprising an open area on at least one side of the internal box to mount a fixed or pull out shelf;
   one or more lids attached to a top of the internal box and covering the open top of the external and internal box, a top portion of the internal box being larger in dimension than the external box to provide closure, rain protection and weather protection;
   at least one pull out storage compartment in at least one side of the internal box;
   a battery operated lift means attached to a lifting tower mounted on a bottom of an interior floor of the external box, the lift means for vertically raising and lowering the internal box from inside the external box, wherein the battery operated lift means is a scissor lift with a center pivot shaft, the pivot shaft attached to a battery powered linear actuator used for raising and lowering the internal box on the scissor lift;
   wherein the linear actuator is mounted on an actuator tower and an internal battery and a control module are mounted on or adjacent to a top of the actuator tower; and
   the container is equipped with at least one of: a first alarm that activates when the internal box is not properly lowered and seated on top of the external box, a second alarm that activates when the lid is not properly closed, and a third alarm that activates when the container is requested to drive the internal box down and all shelves and storage compartments are not closed.

9. The storage container as described in claim 8 further including a sliding pull out storage shelf in an opposite side of the internal box.

10. The storage container as described in claim 9 further including a rotating bin on top of the sliding teal storage shelf for providing quick access to items on the rotating bin.

11. The storage container as described in claim 10 further including a rear shield mounted adjacent the rotating bin.

12. The storage container as described in claim 8 wherein the pull out storage compartment is a tilting storage compartment adapted for easy viewing of items stored therein.

13. The storage container as described in claim 8 wherein the lid is a pair of wing lids, by raising one or both of the wing lids, items can be accessed in the top portion of the internal box without raising the interior box relative to the exterior box.

14. A telescoping storage container adapted for receipt in a bed of a pickup truck and behind a cab of the truck or on a job site, the storage container comprising:
   a pair of lid wings;
   an open top external box;
   an open top internal box, the lid wings attached to the top of the internal box for covering the open tops in the external and internal boxes, the internal box slideably received inside the external box, the internal box including a top portion and a bottom portion divided by a dividing panel, the top portion adapted for holding items therein, by lifting one of the lids, items can be accessed in the top portion without raising the interior box relative to the exterior box;
   a battery operated scissor lift with scissor arms attached to the external box and the internal box, the scissor arms having offset arms for allowing the scissor lift to lay flat on top of a bottom of the external box, the scissor lift used for raising and lowering the internal box inside the external box, wherein the battery operated scissor lift includes a center pivot shaft, the pivot shaft attached to a battery powered linear actuator used for raising and lowering the internal box on the scissor lift, and wherein the linear actuator is mounted on an actuator tower and an internal battery and a control module are mounted on top of the actuator tower; and one or more sliding, tilting, storage compartments mounted in one side of the bottom portion of the internal box; and a sliding storage shelf mounted on an opposite side of the bottom portion of the internal box.

15. The storage container as described in claim 14 further including a perimeter pressure sensor mounted on the perimeter of the internal box and the external box, the sensor initiating an alarm when the internal box is not properly lowered on top of the external box.

16. The storage container as described in claim 14 further including drawer and shelf switches for turning off the linear actuator for failure to completely close the drawer or shelf.

17. The storage container as described in claim 14 further including lid electric locks for locking the internal box inside the external box.

18. The storage container as described in claim 14 further including a battery select switch adapted for connecting to a vehicle battery, the select switch allowing an operator to choose battery power from the internal battery or an external battery.

19. The storage container as described in claim 14 further including a charging regulator for the internal battery.

20. The storage container as described in claim 14 further including an over current monitor for the linear actuator.

* * * * *